Nov. 27, 1956　　A. C. DE NAPOLI, JR., ET AL　　2,772,093
RECORDING AND PLAYBACK ARM OPERATING AND
SETTING MEANS FOR DICTATING MACHINES
Filed Dec. 31, 1949　　　　　　　　　　　　　6 Sheets-Sheet 1
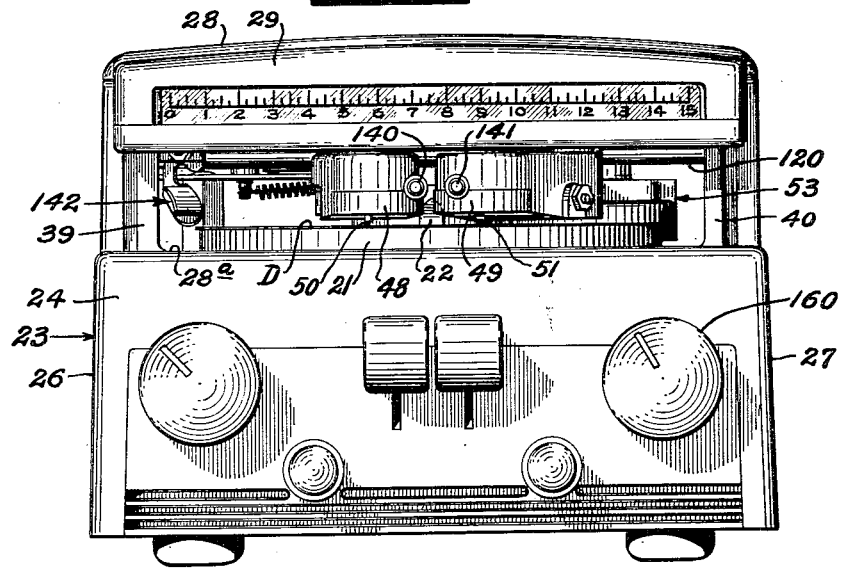
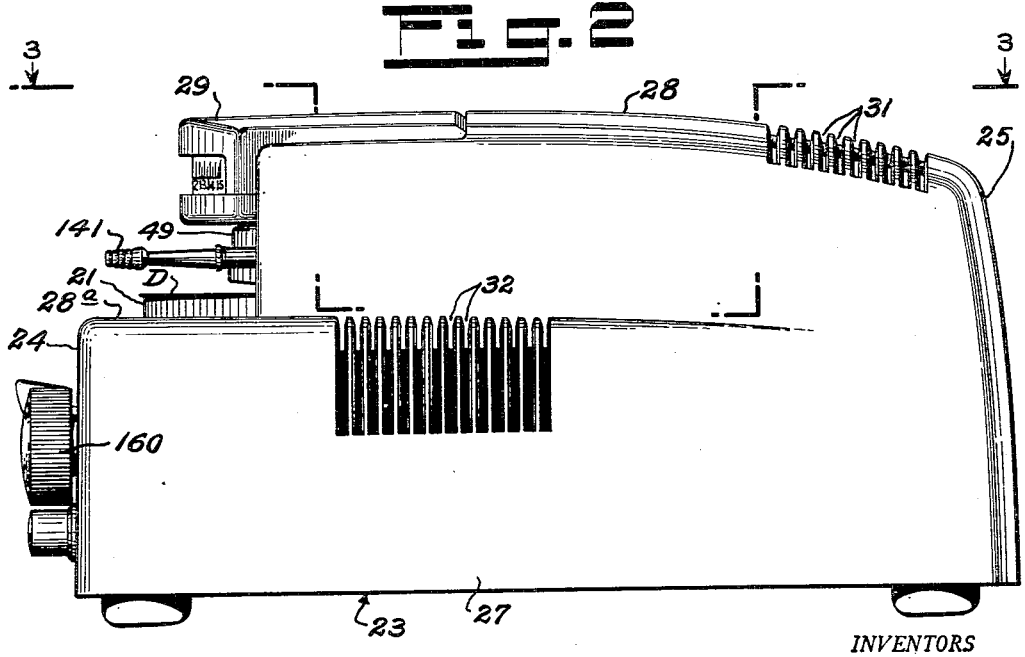
INVENTORS
ANTHONY C. DE NAPOLI, JR.
FRANK E. RUNGE
BY H. G. Manning
ATTORNEY

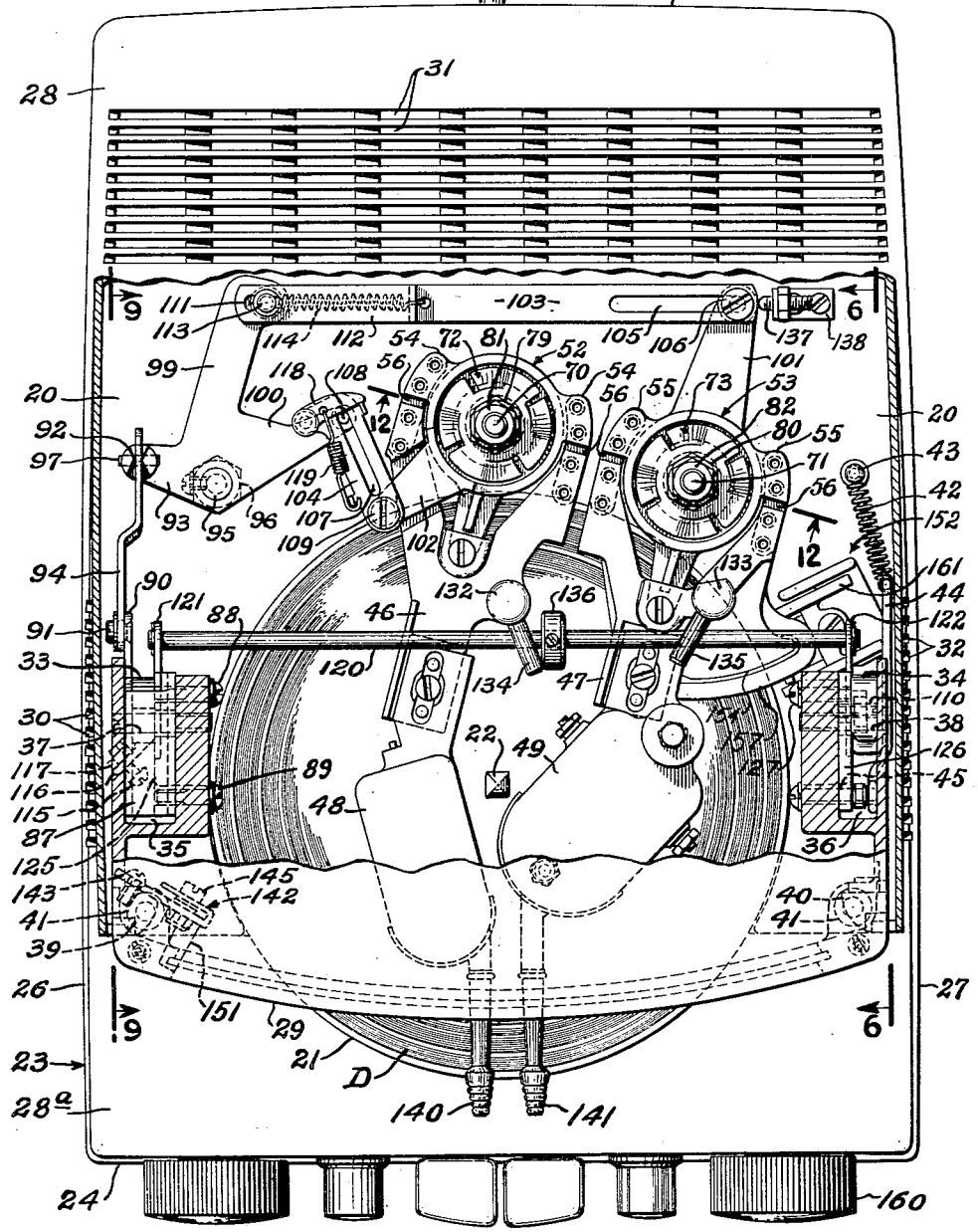

Nov. 27, 1956   A. C. DE NAPOLI, JR., ET AL   2,772,093
RECORDING AND PLAYBACK ARM OPERATING AND
SETTING MEANS FOR DICTATING MACHINES
Filed Dec. 31, 1949   6 Sheets-Sheet 3
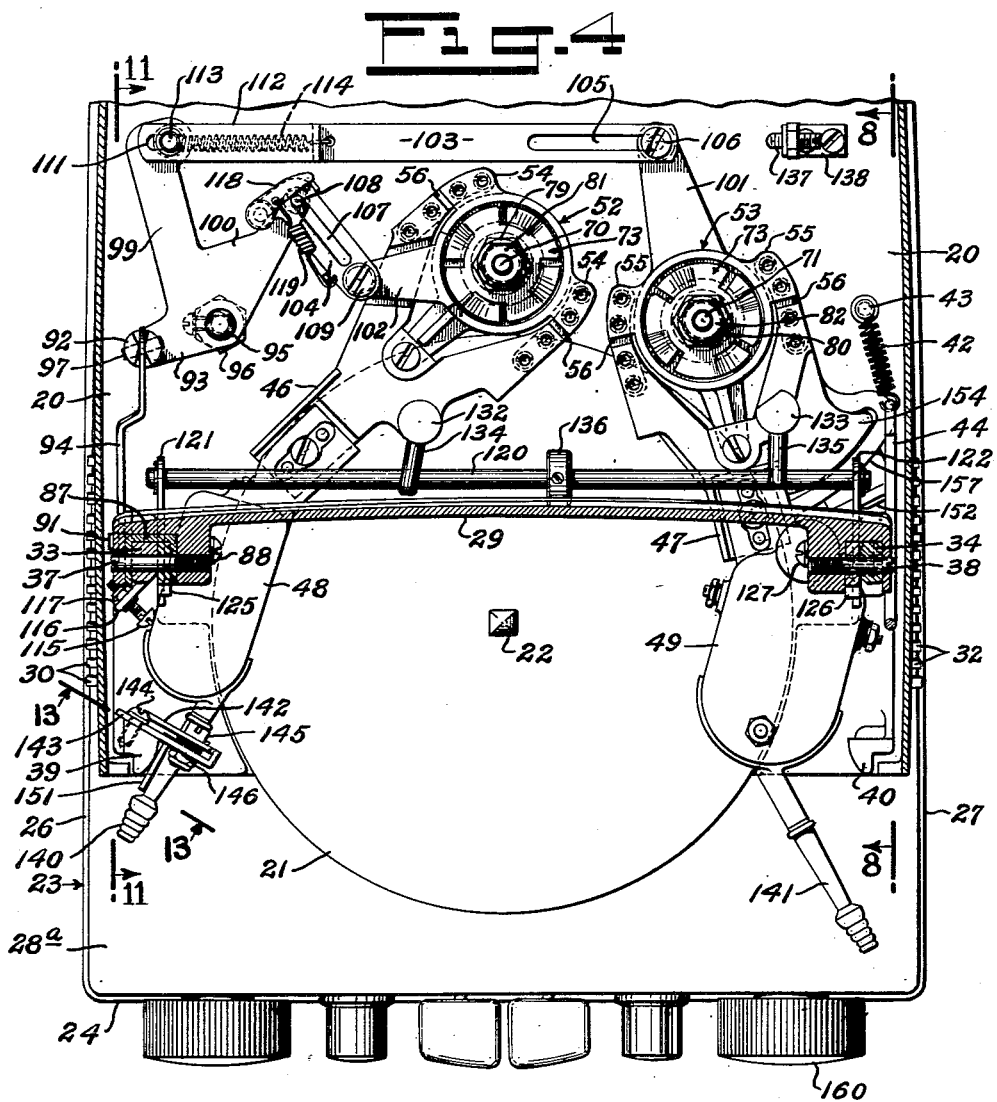
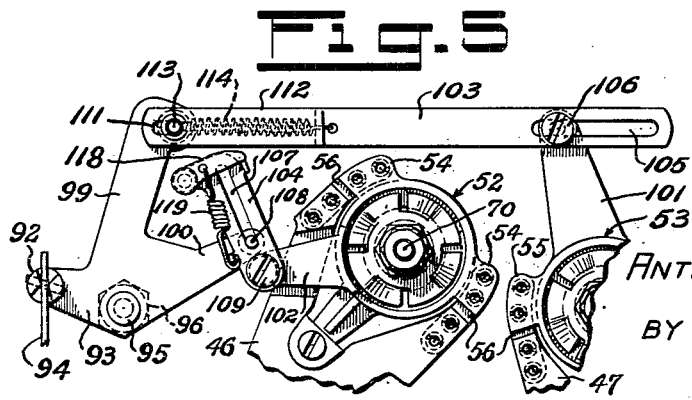
INVENTORS
ANTHONY C. DeNAPOLI, JR.
FRANK E. RUNGE
BY H. G. Manning
ATTORNEY

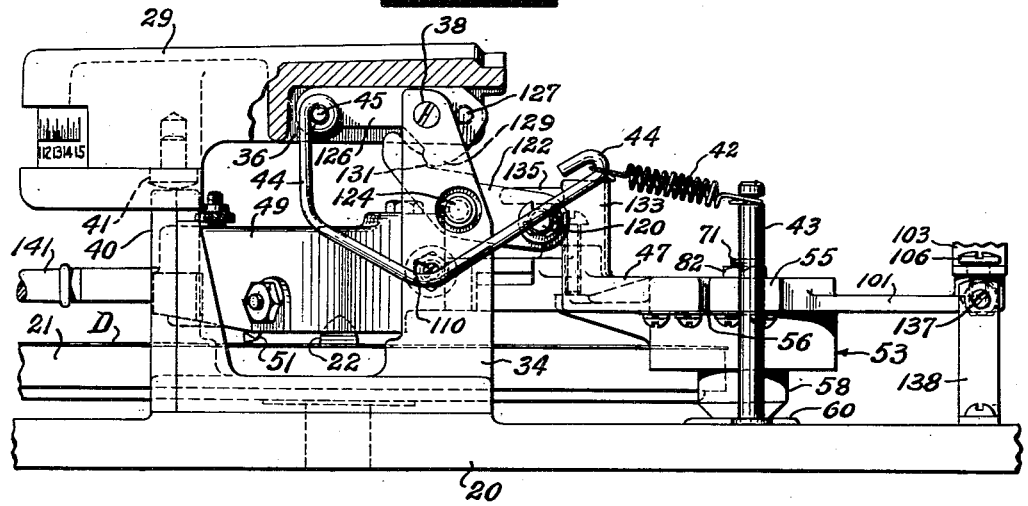
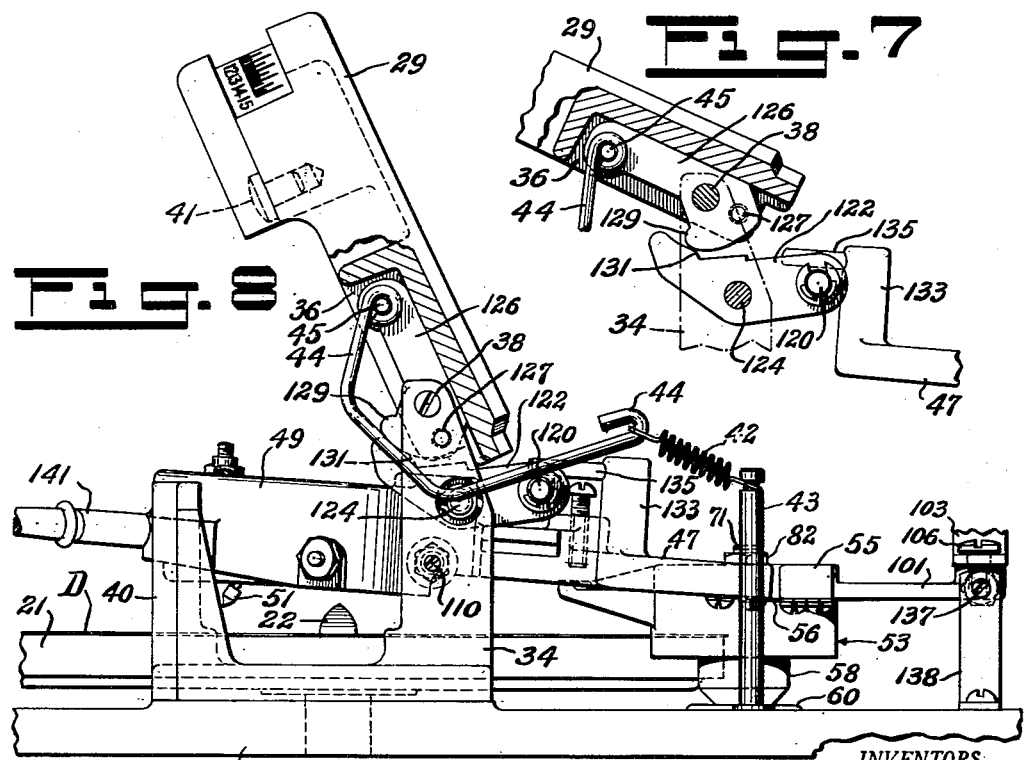

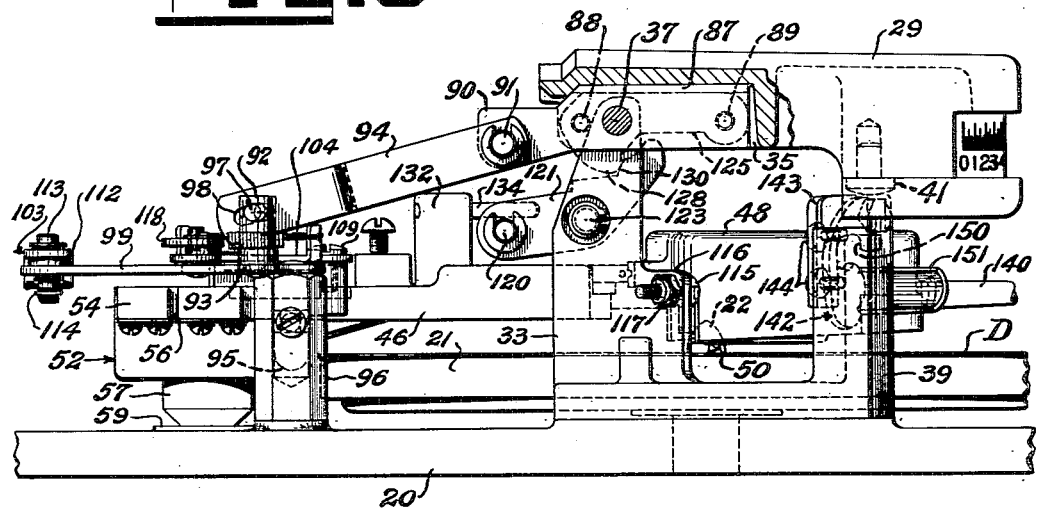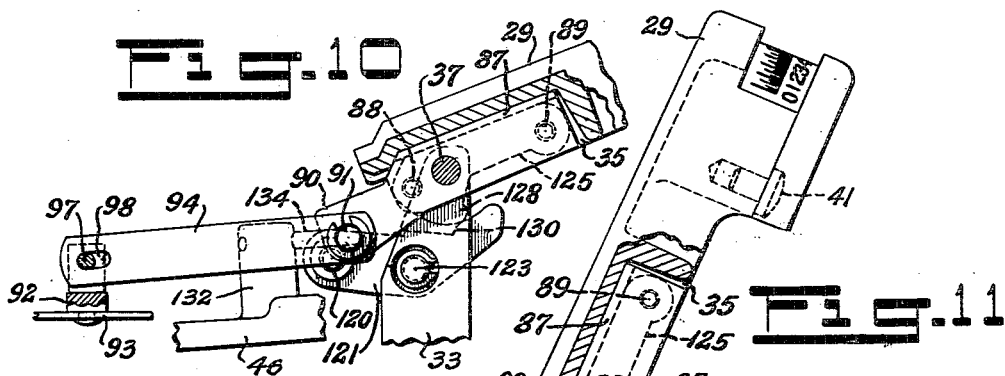

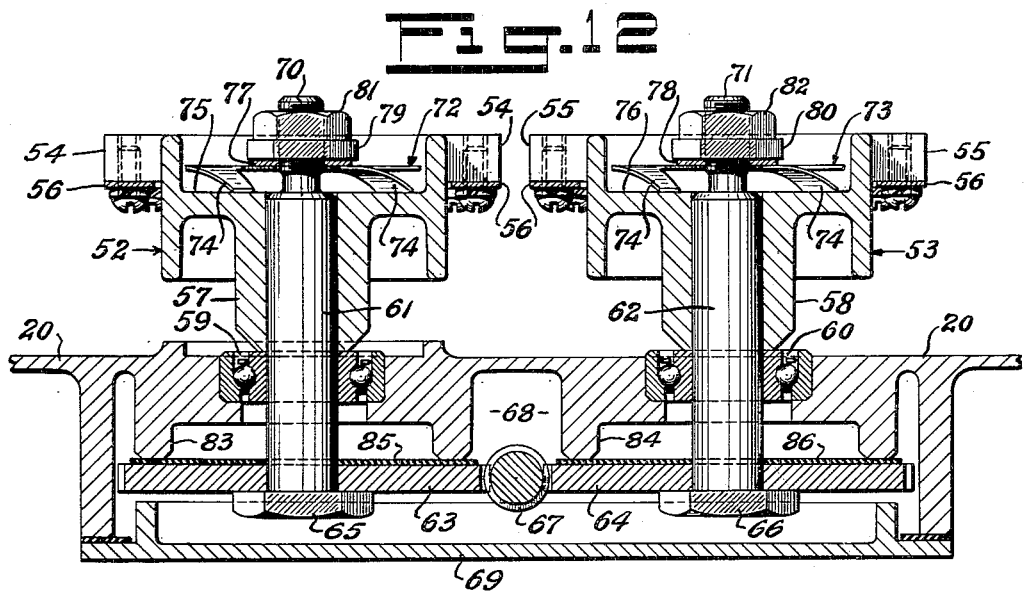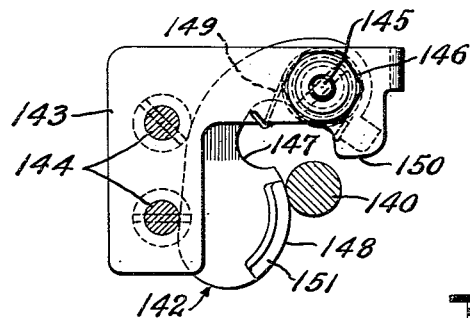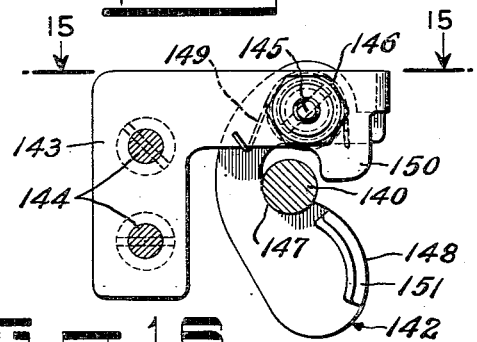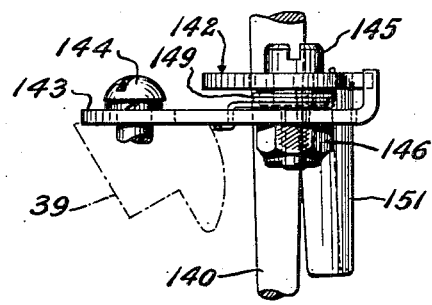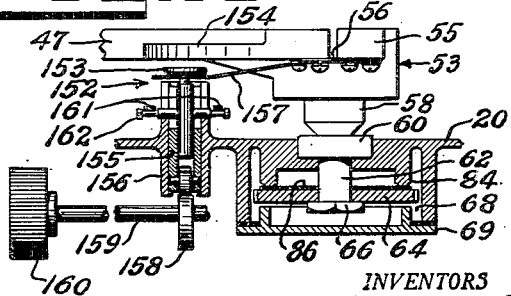

United States Patent Office 2,772,093
Patented Nov. 27, 1956

2,772,093

RECORDING AND PLAYBACK ARM OPERATING AND SETTING MEANS FOR DICTATING MACHINES

Anthony C. De Napoli, Jr., Windsor, and Frank E. Runge, Branford, Conn., assignors to The Soundscriber Corporation, New Haven, Conn., a corporation of Connecticut Application December 31, 1949, Serial No. 136,222

26 Claims. (Cl. 274—14)

This invention relates to phonographic dictating machines of the type having a pair of stylus-carrying arms or carriages which are movable across a revolving record disk for respectively recording and playing back a spiral sound track on the disk, and more particularly to coordinated means for driving and retracting both of said arms or carriages.

One object of this invention is to provide a machine of the above nature which may be normally prepared for operation and operated without manual adjustment or any other direct manipulation of the recording and playback arms, while permitting independent manual adjustment of said arms when desired by the operator.

Another object is to provide a machine of the above nature in which the arm driving means will be optionally effective to feed either one of the arms or both of the arms laterally across the record disk at synchronized speeds.

Another object is to provide a machine of the above nature having a manually-operable cover which, while being opened, will simultaneously operate a retracting mechanism for raising and moving the recording and playback arms to their starting positions in a predetermined peripheral zone adjacent opposite edges of the record disk, whereby the disk will be rendered easily accessible for removal or replacement.

Another object is to provide a machine of the above nature in which operation of the cover attendant upon the insertion of a blank record disk into the machine will cause the recording stylus and the playback stylus to be set in their proper starting positions upon the surface of the disk.

Another object is to provide a machine of the above nature in which operation of the cover will automatically set the playback arm to follow the recording arm by a predetermined number of turns of the spiral sound track or groove, whereby the operator may play back the last-recorded part of the dictation at any time without manipulation of either of the arms.

Another object is to provide a machine of the above nature in which the last-recorded part of the dictation may be played back without interrupting the continuity of the groove formed upon the disk by the recording stylus.

Another object is to provide a machine of the above nature in which the playback arm will normally follow the movement of the recording arm during recording and playback operations, and in which the playback arm is also adapted to play back any previously recorded portion of the disk while the recording arm remains stationary in the location at which dictation was suspended, whereby dictation may be resumed at said location without requiring lateral adjustment of the recording arm.

A further object is to provide a machine of the above nature which will be easy to use and manipulate, flexible in operation, compact, ornamental in appearance, and very efficient and durable in use.

With these and other objects in view, there has been illustrated on the accompanying drawings one form in which the invention may conveniently be embodied in practice.

In the drawings,

Fig. 1 is a front view of a dictating machine embodying the improved arm operating means.

Fig. 2 is a side view of the same.

Fig. 3 is a plan view of the same, taken partly in section on the broken line 3—3 of Fig. 2, showing the cover in closed position, and showing the recording and playback arms in the positions they would occupy adjacent the center of the record disk at the end of a recording operation.

Fig. 4 is a partial sectional plan view, similar to Fig. 3, but showing the parts as they would appear when the cover has been raised with attendant lifting and retraction of the recording and playback arms to starting position so as to permit removal or replacement of the record disk.

Fig. 5 is a fragmentary view, showing parts of the retracting mechanism as they would appear when the recording and playback arms have been retracted to starting position, as in Fig. 4, but after the cover has been closed preparatory to operation of the machine.

Fig. 6 is a partial longitudinal sectional view, taken on the line 6—6 of Fig. 3, parts being omitted in the interest of clarity.

Fig. 7 is a sectional view, similar to a portion of Fig. 6, but showing how the head-lifting rod would be fully raised at an intermediate point in the opening movement of the cover.

Fig. 8 is a partial longitudinal sectional view, taken substantially on the line 8—8 of Fig. 4, showing the recording arm fully retracted and lifted to hold the recording stylus disengaged from the record disk, thus permitting removal of said disk.

Fig. 9 is a partial longitudinal sectional view, taken on the line 9—9 of Fig. 3.

Fig. 10 is a sectional view, similar to a portion of Fig. 9, but showing how the head-lifting rod would be fully raised at an intermediate point in the opening movement of the cover, and before lateral retraction of the arms has commenced.

Fig. 11 is a partial longitudinal sectional view, taken on the line 11—11 of Fig. 4, showing the playback arm fully retracted and lifted to hold the playback stylus disengaged from the record disk, thus permitting removal of said disk.

Fig. 12 is a partial cross sectional view, taken on the line 12—12 of Fig. 3, showing the means for swingably supporting and driving the recording and playback arms.

Fig. 13 is a cross sectional view, taken substantially upon the broken line 13—13 of Fig. 4, showing the handle of the playback arm in the position it would assume in relation to the latch when the arm retracting and lifting mechanism has been actuated by opening the cover.

Fig. 14 is a view similar to Fig. 13, but showing the handle in the position it would occupy after it has been further lifted manually by the operator so as to be held by the latch.

Fig. 15 is a plan view of the same.

Fig. 16 is a fragmentary cross sectional view showing the clamping device for raising and holding the recording arm in a stationary position.

Referring now to the drawings in which like reference numerals denote corresponding parts throughout the several views, the numeral 20 indicates a horizontal motor board which rotatably carries a turntable 21 upon a vertical spindle 22.

The motor board 20 is enclosed and concealed by an approximately rectangular dictating machine cabinet 23 having a front wall 24, a rear wall 25, and side walls 26, 27, which side walls are stepped rearwardly at approximately the level of the motor board 20 so as to expose a minor front portion of the turntable 21. The cabinet 23 has a flat shelf 28a which encloses the lower front portion of said cabinet forwardly of the turntable 21.

The cabinet 23 also comprises a top wall 28 which overlies a rear portion of the motor board 20, and which terminates rearwardly of the spindle 22, provision being made of a vertically swingable cover 29 which is adapted to overlie the turntable 21 in flush relationship with the top wall 28.

The cabinet 23 may, if desired, be provided with suitable ventilating grills 30, 31, and 32.

In order to swingably support the cover 29, the motor board 20 is provided with a pair of left and right hand stanchions 33, 34, respectively, which are located adjacent opposite edges of the turntable 21 and which have laterally apertured upper ends disposed a short distance forwardly of and below the level of the top wall 28.

The opposite rear corners of the cover 29 are provided with a pair of recesses 35, 36 which are elongated in a forward and rearward direction, said recesses being open in a downward direction and having the upper apertured ends of the stanchions 33, 34 pivotally secured therein by means of pivot screws 37, 38. Thus, the cover 29 may be swung either to an upward open position in which the turntable 21 will be accessible to the operator (as shown in Fig. 8, for example) or to a horizontal closed position in which a major portion of the turntable 21 will be covered (as illustrated in Fig. 6, for example).

In its closed position, the front portion of the cover 29 will be supported by a pair of posts 39, 40 which are provided on the motor board 20 adjacent the front edges of the rearwardly stepped portions of the cabinet side walls 26, 27, the front corners of the cover 29 being provided with a pair of resilient bumpers 41 to cushion the engagement of the cover with said posts.

The cover 29 is adapted to be held selectively in open or closed position by means of a coil spring 42 which is anchored to a post 43 on the motor board 20 rearwardly of the right-hand stanchion 34, and which is connected to the cover 29 forwardly of the pivot screw 38 by a link 44 and a screw 45 disposed across a forward portion of the elongated recess 36. The link 44 is angular in shape so as to provide operating clearance at the rear edge of the cover 29 when said cover is open (Fig. 8). It will be seen that the spring 42 is anchored to the post 43 at a point which is below the level of the pivot screw 38, whereby the spring 42 will have a toggle action.

In order to perform playback and recording operations with respect to a disk D upon the turntable 21, the machine is provided with a pair of carriages which are relatively movable across said disk D, and which have phonographic transducers for forming and playing back a sound track on the disk. As shown, the carriages are in the form of swingable playback and recording arms 46, 47, which respectively comprise a playback head 48 and a recording head 49 having styli 50, 51. The rear ends of the playback and recording arms 46, 47 are forked so as to extend at opposite sides of a pair of mounting hubs 52, 53, respectively, said hubs being provided with pairs of side lugs 54, 55, connected to the forked rear ends of said arms by a plurality of flat hinge springs 56 which are so arranged as to have flexible zones disposed in diametrical relationship with respect to the mounting hubs 52, 53.

The mounting hubs 52, 53 are provided with respective downwardly-extending tubular portions 57, 58 (Fig. 12) which rest upon ball bearing assemblies 59, 60 supported in the motor board 20, and which rotatably embrace upper portions of a pair of vertical feed shafts 61, 62 mounted in said bearing assemblies.

In order that equal swinging movements of the playback and recording arms 46, 47 shall cause the styli 50, 51 to have equal movements, the arms 46, 47, the heads 48, 49, and the hubs 52, 53 are carefully proportioned so that the styli 50, 51 are equidistant from the axes of the respective feed shafts 61, 62. Further, the axes of the feed shafts 61, 62 are made equidistant from the axis of the turntable spindle 22. Thus, it will be seen that the styli 50, 51 are adapted to describe equivalent lateral paths across opposite portions of the turntable 21.

A pair of identical worm gears 63, 64 are applied with a press fit to the shafts 61, 62, and are disposed against heads 65, 66 at the lower ends of said shafts below the motor board 20. The worm gears 63, 64 are engaged with a suitable common drive means, such as a horizontal worm 67 disposed between said gears.

The worm 67 and the gears 63, 64 are preferably located in a chamber 68 formed at the lower side of the motor board 20 and closed by a bottom cover 69, whereby a suitable lubricant may be retained around said gears, and dust may be excluded.

In order to impart rotating movement to the mounting hubs 52, 53, and thus swing the playback and recording arms 46, 47, the feed shafts 61, 62 are provided with threaded reduced upper ends 70, 71 carrying centrally-apertured circular pressure springs 72, 73, each having a plurality of downturned peripheral spring arms 74 engaging flat annular surfaces 75, 76 within the respective hubs 52, 53.

Friction washers 77, 78 of fiber or other suitable material are applied to the upper shaft ends 70, 71 above the pressure springs 72, 73, and are held under pressure by means of tension nuts 79, 80, which are secured against change of adjustment by means of jam nuts 81, 82.

The feed shafts 61, 62 are held in place against the upwardly exerted force of the pressure springs 72, 73, by ring-shaped bearing flanges 83, 84, which extend downwardly from the lower surface of the motor board 20 concentrically with the feed shafts 61, 62 and which engage antibacklash friction disks 85, 86 upon the upper surfaces of the worm gears 63, 64.

Thus, it will be seen that the pressure springs 72, 73 will hold the mounting hubs 52, 53 firmly in position against the bearing assemblies 59, 60, and will, in conjunction with the friction washers 77, 78, provide friction couplings whereby rotation of the feed shafts 61, 62 will swing the playback and recording arms 46, 47, while at the same time permitting said arms to be manually swung independently of the operation of said feed shafts.

It will also be seen that the bearing diameter of the friction disks 85, 86 against the ring-shaped flanges 83, 84 is considerably greater than the diameter of the friction washers 77, 78, whereby the effective frictional action of the disks 85, 86 will be relatively large and will at all times prevent backlash between the worm gears 63, 64, and the worm 67. This construction of the disks 85, 86 and the worm gears 63, 64 further provides the feed shafts 61, 62 with wide effective bases in engagement with the ring flanges 83, 84, whereby said shafts are stabilized and precisely held in parallel vertical positions.

Opening movement of the cover 29 is adapted to lift and swing the playback arm 46 and the recording arm 47 outwardly to positions over opposite edge portions of the turntable 21 by means of a retracting mechanism which is connected to said cover and which comprises a channel bracket 87 fitted within the recess 35 at the left-hand rear corner of the cover 29. The channel bracket 87 is held within said recess by screws 88, 89, and swingably embraces the upper end of the stanchion 33, said channel bracket being apertured to accommodate the pivot screw 37.

The channel bracket 87 comprises a rearwardly-extending arm 90 having a pivot stud 91 which is connected to a slotted stud 92 of a bell crank lever 93 by means of a link 94, said bell crank lever 93 being mounted for horizontal swinging movement by means of a vertical stem 95 pivotally held in an upstanding post 96 on the motor board 20.

The slotted stud 92 is provided with a cross pin 97 engaged in a short longitudinal slot 98 (Fig. 10) in the link 94, said slot being so arranged that the link 94 will impart no movement to the bell crank lever 93 until the cover 29 has been raised to a predetermined point, as will be further described hereinafter.

The bell crank lever 93 comprises a rearwardly-extending arm 99 (Fig. 4) and a laterally extending arm 100 which are connected to respective radially extending arms 101, 102 integral with the mounting hubs 53 and 52, by means of connecting links 103, 104. It will be noted that the radial arm 101 extends in a rearward direction from the hub 53, while the arm 102 extends in an oblique forward direction from the hub 52, so that counterclockwise movement of the bell crank lever 93 will cause the playback arm 46 and the recording arm 47 to be swung outwardly in opposite directions toward the edges of the turntable 21.

In order to prevent the retracting mechanism from interfering with the operation of the playback and recording arms 46, 47, when the cover 29 is closed and the bell crank lever 93 is in its normal position (i. e., swung to the right, as illustrated in Figs. 3 and 5), the connecting link 103 is attached to the radial arm 101 by means of an elongated slot 105 and a screw stud 106, and the connecting link 104 is provided with an elongated slot 107 engaged with a stud 108 on the end of the arm 100 of the bell crank lever 93, one end of said link 104 being connected to the radial arm 102 by means of a screw 109. Thus, it will be seen that the slot 105 and the stud 106 provide an overriding connection which permits reverse movement of the connecting link 103 and the other parts of the retracting mechanism without causing corresponding reverse movement of the recording arm 47.

Similarly, the slot 107 and the stud 108 provide an overriding connection which prevents the retracting mechanism from causing reverse movement of the playback arm 46.

When the retracting mechanism is actuated, the bell crank lever 93 will be swung in a counter-clockwise direction, so that the outer end of the slot 105 will engage the screw stud 106 and thus swing the recording arm 47 outwardly until the recording head 49 engages an adjustable stop screw 110 in the right-hand stanchion 34 (Fig. 8).

The stop screw 110 will adjustably determine the position at which outward swinging movement of the recording arm 47 will be stopped, and in order to make the retracting mechanism fully effective without regard to the specific adjustment of the stop screw 110, the bell crank lever 93 is permitted a certain amount of overtravel because of a slot 111 in an upwardly offset portion 112 of the connecting link 103, said slot embracing a stud 113 on the bell crank lever arm 99.

The operating force of the bell crank lever arm 99 is normally exerted upon the connecting link 103 by means of a coil spring 114 which is anchored at its opposite ends to the link 103 and to the stud 113, respectively. It will thus be seen that the spring 114 may yield after the recording head 49 has engaged the stop screw 110, and will thus permit overtravel of the bell crank lever 93 and full opening of the cover 29.

Similarly, outward swinging movement of the playback arm 46 and the head 48 will be limited by a stop screw 115 (Fig. 4) which is adjustably mounted in a wing 116 integral with the left hand stanchion 33, and which is held against change of adjustment by a stop nut 117. However, any interference of the playback stop screw 115 with overtravel of the bell crank lever 93 will be avoided by a resilient connection comprising a pivoted finger 118 which is mounted on the rear end of the connecting link 104, and which is pressed forwardly by a coil spring 119 anchored to said connecting link 104 (Figs. 3, 4, and 5). The coil spring 119 is sufficiently strong to transmit the normal operating force of the bell crank lever 93 to the connecting link 104 by virtue of the engagement of the stud 108 with the pivoted finger 118. However, when the playback head 48 engages the stop screw 115, thus stopping the movement of the connecting link 104, the pivoted finger 118 may yield so as to permit overtravel of the stud 108 and the bell crank lever 93.

It will, of course, be desirable to provide the retracting mechanism with means for raising the playback and recording heads 48, 49 so as to lift the styli 50, 51 from the record disk D when the playback and recording arms 46, 47 are to be swung to their outward positions, and also to hold said styli lifted and thus permit removal or replacement of said disk when the cover 29 is open. This is accomplished by means comprising a horizontal lifting rod 120 which is secured in the rear end portions of a pair of vertically swingable lifting levers 121, 122, and which extends laterally above central portions of the arms 46, 47. The lifting levers 121, 122 have laterally extending central pivot pins 123, 124 which are supported in horizontal bearings in the left and right hand stanchions 33, 34, respectively (Figs. 6 and 9).

Swinging movement of the cover 29 is adapted to operate the lifting levers 121, 122 by means of a pair of apertured elongated cam pieces 125, 126, which are mounted within the cover recesses 35, 36. The cam piece 125 is held within the channel bracket 87 by means of the screws 88, 89, while the cam piece 126 is held within the recess 36 by means of the screw 45 and an additional screw 127 extending through said recess. Both of the cam pieces 125, 126 are apertured to accommodate the pivot screws 37, 38, respectively.

In order to obtain complete operation of the lifting levers 121, 122 during a small initial portion of the upward opening movement of the cover 29, the cam pieces 125, 126 are provided with depending noses 128, 129 (Figs. 6 and 9), which are adapted to engage behind upwardly-projecting shoulders 130, 131, on the forward portions of the lifting levers 121, 122.

The rearward surfaces of the cam noses 128, 129 are arcuate in concentric relationship to the pivot pins 37, 38, respectively, so that further opening movement of the cover 29 will merely hold the lifting rod 120 in a raised position without further movement thereof.

The lifting rod 120 is adapted to raise the playback arm 46 and the recording arm 47 by means of upwardly-extending posts 132, 133, which are integral with the respective arms and which have forwardly-projecting studs 134, 135. The studs 134, 135 overhang the lifting rod 120 in all positions of the arms 46, 47 and are so arranged that said arms will be raised and both of the styli 50, 51 will be lifted from the disk D when the lifting rod 120 is in its upper position. When the lifting rod 120 is lowered, it will release the studs 134, 135 so that the arms 46, 47 will descend and the styli 50, 51 will rest upon the disk D.

It will here be noted that the slot 98 in the retracting link 94, together with the crosspin 97 provides a connection which is so arranged that the bell crank lever 93 will not be operated until after the lifting mechanism has raised the arms 46, 47, so that the operation of the retracting mechanism cannot drag the styli 50, 51 laterally across the record disk D and said disk cannot be damaged by the recording stylus 51.

The lifting rod 120 preferably carries an adjustable apertured disk 136 which is adapted to be engaged by the lifting stud 134 and thus will serve as an inner stop for swinging movement of the playback arm 46.

An inner stop for the swinging movement of the recording arm 47 is provided in the form of an adjustable stop screw 137 carried in an upstanding angle bracket 138 on the rear portion of the motor board 20, said stop screw 137 being arranged for engagement by the radial arm 101 on the recording arm mounting hub 53.

In view of the foregoing, it will be seen that the styli 50, 51 will be disengaged from the record disk D during outward swinging of the playback and recording arms 46, 47, and will remain in raised positions above opposite edge portions of the turntable 21 until the cover 29 is again closed in preparation for a recording operation, at which time said styli may drop into operating positions in a predetermined zone of a disk D on said turntable.

When the dictating machine is in its usual operating condition, the playback arm 46 and the recording arm 47 will be so set with relation to each other that the playback stylus 50 will trail the recording stylus 51 by a predetermined distance while said arms or carriages are swung inwardly at equal speeds and over the record disk D by the feed shafts 61, 62.

That is, the playback stylus 50 will be located somewhat farther than the recording stylus 51 from the turntable spindle 22, so that, as the turntable 21 is rotated, the spiral groove formed in the record disk D will be engaged by the playback stylus 50 several turns (e. g. 3 or 4) behind the recording stylus 51. Thus, the operator may play back the last-recorded portion of the disk D at any time without manipulation of the arms and without breaking the continuity of the spiral groove.

The above-described trailing relation of the playback arm to the recording arm may be established merely by the operation of the retracting mechanism in swinging the transducers or heads 48, 49 outwardly against the respective stop screws 115, 110, said screws being so adjusted as to permit the playback head 48 to swing farther outwardly than the recording head 49.

However, it will be noted that the friction washers 77, 78 in the mounting hubs 52, 53 will permit either or both of the playback and recording arms 46, 47 to be manually swung and independently adjusted to any desired point by the operator, thus providing complete flexibility in the use of the machine. In order to facilitate manual swinging of the arms 46, 47, the playback and recording heads (48, 49 are provided with handles 140, 141, respectively, which extend forwardly of the cover 29 so as to be accessible when said cover is in closed position.

The operator may, at times, wish to hold the playback carriage or arm 46 out of operation, as for example during an extended recording operation during which review of the recorded material probably will not be required. In such an event, the playback handle 140 will be engaged with a depending C-shaped latch element 142 (Figs. 13, 14, 15) supported upon an L-shaped bracket 143 which is secured to the left hand cover supporting post 39 by means of a pair of screws 144. The latch element 142 is pivotally attached to the bracket 143 by means of a screw 145 and a nut 146, and is provided with a central notch 147 and an enlarged lower end 148.

When the playback head 48 is raised and swung against the stop screw 115 by the retracting mechanism, the playback handle 140 will occupy the position shown in Fig. 13, in which position said handle 140 engages the enlarged lower end portion 148 of the latch element 142, and is incapable of engagement in the notch 147. Thus, it will be seen that mere operation of the cover 29 will not latch the playback handle 140 and the playback head 48 will ordinarily be placed in operating position when the cover 29 is closed. However, if the operator desires to latch the playback handle 140, it will merely be necessary to raise said handle manually to the position shown in Fig. 14, whereupon the latch element 142 will be swung under said handle by a coiled spring 149 embracing the screw 145, so that the handle 140 will be locked behind a small depending lug 150 at the end of the L-shaped bracket 143. The recording head 49 may now be operated in the usual manner while the playback head 48 will be held stationary against the action of the friction washer 77.

The operator may release the playback handle 140 from the latching element 142 when desired merely by pressing a thumbpiece 151 formed upon the lower portion 148 of said latching element.

When the operator wishes to suspend a recording operation while an extended portion of the recorded material is played back, or for any other reason, the recording head 49 may be raised at any point in its swinging movement and held stationary by a clamping device 152 (Figs. 3 and 16) which may be similar to that which is disclosed in Patent No. 2,478,722, entitled "Phonograph Recording Arm Clamp," issued to Lincoln Thompson on August 9, 1949.

The clamping device 152 comprises a headed lifting rod 153 which is adapted to engage the lower surface of a horizontal sector 154 integral with the recording carriage or arm 47, and which is vertically slidable in a longitudinally slotted sleeve 155, said sleeve in turn being vertically slidable in a tubular bearing 156 in the motor board 20. The sleeve 155 is fixed against lateral movement and serves as an abutment for the lower surface of a vertically resilient clamping plate 157 which is attached to the arm 47 and which is arcuately slotted so as to allow free swinging of said arm while embracing the lifting rod 153 below the head thereof.

The lower end of the sleeve 155 is supported on an eccentric cam 158 on a horizontal shaft 159 having a knob 160 at the front of the machine. Thus, when the knob 160 is turned, the sleeve 155 will be raised so as to frictionally grip the resilient plate 157 between said sleeve and the head of the lifting rod 153, and at the same time the lifting rod 153 will engage the sector 154 and raise the arm 47.

In order to provide a definite clamping action on the resilient plate 157, the lifting rod 153 is urged downwardly by flat springs 161 pressing upon a cross pin 162 in said rod and movable in the slots in said sleeve 155. The clamping action on the plate 157 will be so adjusted as to overcome the driving force of the friction washer 78 in the recording arm mounting hub 53, while being insufficient to prevent manual swinging of the recording arm 47.

The tubular bearing 156 is so constructed as to be engaged by the crosspin 162 and thus support the lifting rod 153 when the cam 158 is turned to permit the sleeve 155 to drop, whereby the resilient clamping plate 157 will be relieved of any pressure which would interfere with the normal operation of the recording arm 47.

Operation

When the cover 29 is opened in preparing the machine for operation, the first part of the opening movement will cause the lifting rod 120 to engage and raise the lifting studs 134, 135 for lifting the styli 50, 51 from the turntable 21 after which the movement of the cover will actuate the bell crank lever 93 for swinging the playback and recording heads 48, 49 outwardly against the stop screws 115 and 110.

A record disk D may be now placed upon the turntable 21, and the cover 29 may be closed so as to release the lifting rod 120 and permit the styli 50, 51 to engage opposite edge portions of the disk D in a predetermined peripheral zone on said disk. The playback stylus 50 will now be in position to trail the recording stylus 51 by a predetermined number of turns of the record groove, and the dictating machine may be placed in operation. The styli 50, 51 will be driven across the record disk D toward the spindle 22 at identical speeds, thus enabling the operator to obtain a quick review of the last-recorded portion of the dictation at any time without requiring any manipulation of the playback and recording heads, and without interrupting the continuity of the groove formed by the recording stylus 51.

In the event that the operator should desire to play back an extensive portion of the recorded material, he may swing the playback arm 46 manually to the desired starting position by means of the handle 140, this swinging movement being permitted by the friction washer 77 on the feed shaft 61. During such an extended playback operation, the recording arm 47 may be held in a stationary raised position by the clamping device 152, whereby recording may be later resumed at the location upon the disk D at which is was discontinued.

When the surface of the disk D has been recorded to its capacity, the parts of the machine will occupy the positions shown in Figs. 3, 6, and 9, and the cover 29 may be raised so as to operate the retracting mechanism in the manner described above, thus placing the parts again in the position shown in Figs. 4, 8, and 11, and permitting removal of the recorded disk D.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letter Patent, is:

1. In a dictating machine, means comprising a swingable recording arm for forming a spiral sound track starting in a predetermined outer zone of a disk record member, means for playing back the recorded spiral sound track comprising a swingable playback arm, power drive means comprising friction couplings for moving said recording arm and said playback arm at identical speeds in opposite directions inwardly across said record member away from said outer zone, mechanism for simultaneously retracting said recording arm and said playback arm to said outer zone against the frictional force of said couplings, comprising a manually actuatable operating member accessible at the exterior of the machine said member also forming a cover for said machine, and a lever and linkage device operatively connecting said operating member to said recording arm and to said playback arm.

2. The invention as defined in claim 1, including a pair of adjustable stops respectively engageable by said recording and playback arms for limiting the outward retraction of said arms.

3. The invention as defined in claim 1, including a pair of adjustable stops respectively engageable by said recording and playback arms for limiting the outward retraction of said arms, and in which said connecting devices each comprises a yieldable member for permitting overtravel of said operating member after said arms have engaged said stops, whereby the retracting mechanism may move both of said arms into full engagement with said stops without regard to the specific position of either of said stops.

4. The invention as defined in claim 1, including manually operated clamping means fixed relative to said playback arm operative to hold said playback arm stationary at said predetermined starting zone against the force of said drive means.

5. The invention as defined in claim 1, including a frictional clamping device fixed relative to said recording arm and operative to hold said recording arm stationary against the force of said drive means at any desired point, said retracting mechanism being operative over the frictional holding force of said clamping device.

6. In a dictating machine, means for forming a spiral sound track starting in a predetermined zone on a disk record member, comprising a recording arm swingable on a vertical pivot and movable inwardly across said record member away from said zone, means for playing back the recorded spiral sound track comprising a playback arm swingable on a vertical pivot and movable inwardly across said record member away from said zone, friction drive means for each of said recording and playback arms for moving them away from their respective starting zones, an operating member, means responsive to an initial movement of said operating member for lifting said arms away from the record member, and means connected to said operating member and responsive to a further movement of said operating member for forcing said arms toward said zone against the action of said friction drive means.

7. The invention as defined in claim 6, wherein said connecting means comprises a slot and pin connection between said operating member and said recording and playback arms, the movement of said pin in said slot providing lost motion, whereby said connecting means will be unresponsive to the initial movement of said operating member.

8. The invention as defined in claim 6, in which said connecting means includes a link having a slot and a pin slidable in said slot providing relatively overriding members for permitting free independent movement of said playback and recording arms when said operating member is in an unactuated position.

9. The invention as defined in claim 6, wherein said arm lifting means comprises a horizontal lifting rod extending above with respect to said arms, said arms being provided with forwardly projecting studs above said lifting rod, said lifting rod being carried at its ends in a pair of lifting levers, and a pair of cam pieces attached to said operating member for operating said lifting levers to raise said arms.

10. In a dictating machine, a cabinet, means in said cabinet for rotatively supporting a disk-shaped record member, means for forming a spiral sound track starting in the outer zone of said disk shaped record member, said track forming means comprising a recording arm movable inwardly across said record member away from said zone, means for playing back the spiral sound track comprising a playback arm movable across said record member away from said zone friction drive means for moving said recording and playback arms, a cover pivoted to the top of said cabinet, mechanism responsive to the upward swinging of said cover for simultaneously retracting said recording arm and said playback arm in opposite directions to said zone, said retracting means being coupled to said recording and playback arms and effective to overcome the action of said friction drive means, and a pair of stops on said cabinet respectively engageable by said arms for limiting retraction thereof at said zone, said stops being relatively disposed to permit said playback arm to be retracted farther than said recording arm by a predetermined number of turns of the spiral sound track when the machine is in operation.

11. The invention as defined in claim 10, in which said drive means comprises friction couplings operative to move said recording arm and said playback arm at identical speeds inwardly across the said record member away from said outer zone, whereby the trailing relationship of said playback arm to said recording arm may be maintained during recording, and said arms may be retracted simultaneously against the frictional force of said couplings.

12. The invention as defined in claim 10, in which said drive means comprises a pair of couplings connected with said recording arm and said playback arm respectively, and wherein said drive means is operative to move said arms in opposite directions simultaneously at identical speeds inwardly across said record member away from said zone, in combination with a manually-operable frictional clamping device for lifting said recording arm from said record member and for holding said recording arm stationary against the frictional force of its coupling at any desired point in the movement of said recording arm, whereby the machine may selectively perform a playback operation without breaking the continuity of the sound track, without requiring readjustment of the recording arm when recording is resumed.

13. The invention as defined in claim 6, including cabinet means for supporting said record member and in which the operating member comprises a cover adapted to partially enclose the record member in said cabinet means when in unactuated position and adapted to partially uncover said record member when in actuated position.

14. The invention as defined in claim 1 in which the rear ends of said recording arm and said playback arm comprise forked portions embracing said drive couplings, said forked portions being resilient in a vertical direction.

15. In a dictating machine, means for forming a spiral sound track starting in a predetermined outer zone on a disk record member, comprising a recording arm movable inwardly across said record member, means for playing back the recorded spiral sound track comprising a playback arm also movable inwardly across said record member away from said zone in the opposite direction from the movement of said recording arm, said recording and playback arms each having mounting hubs, a pair of vertical feed shafts within said hubs, circular friction means resiliently engaging each of said hubs to yieldably connect said feed shafts to said hubs, drive gears on said feed shafts, and a worm for simultaneously driving both of said drive gears in opposite directions, a second friction means for each of said hubs to inhibit motion of their respective drive gears, said circular friction means each comprising a spring, and means including said shafts for exerting compressional force of said springs against said second friction means respectively said hub-engaging friction means being smaller than said gear motion inhibiting friction means, whereby backlash will be prevented.

16. In a dictating machine, cabinet means for supporting a rotatable disk record, a recording arm having a mounting hub about which it is swingable for forming a spiral sound track on said record, a playback arm having a mounting hub about which it is swingable for reproducing the sound recorded on said spiral sound track, means for moving said recording arm and said playback arm in different directions across said record at identical speeds, comprising friction drive couplings connected to said recording arm and said playback arm respectively, mechanism cooperatively connected with said recording and playback arms for simultaneously and forceably retracting them to the outer portion of said record against the frictional force of said couplings, whereby said record will be readily accessible for removal, and a cover hinged to said cabinet means, said retracting means being operatively connected to said cover for operating said retracting means.

17. The invention as defined in claim 16, including means operative by the lifting of said cover to first raise said recording arm and said playback arm from said record and thereafter swing said arms simultaneously to the outer portion of said record.

18. The invention as defined in claim 16, including means operative by the lifting of said cover to automatically set the playback arm to follow the recording arm by a predetermined number of turns in the spiral sound track, whereby the operator may play the last recorded part of the dictation at any time without manipulation of either of said arms.

19. The invention as defined in claim 16, in which means are provided to cause the playback arm to follow the movement of the recording arm by a predetermined distance, and means for holding said recording arm stationary in raised position during playback at the location at which dictation was suspended, whereby dictation may be resumed at said location without requiring lateral adjustment of said recording arm.

20. The invention as defined in claim 16, in which provision is made of a U-shaped link connected to said cover and connected to the base of said machine by a spring for exerting pressure upon said cover to hold it selectively in open and closed position with a toggle action.

21. The invention as defined in claim 16, in which said retracting means includes a bell crank lever having a pair of arms connected respectively by links to the mounting hubs of said recording arm and said playback arm respectively, the link connected to said playback arm hub being shorter than the link connected to said recording arm hub.

22. The invention as defined in claim 16, in which a horizontal lifting rod is provided which is operatively connected to said cover for raising the recording arm and playback arm heads simultaneously from said record.

23. The invention as defined in claim 22, in which an adjustable disk is mounted at an intermediate point on said lifting rod to form a stop to limit the inward movement of said playback arm.

24. The invention as defined in claim 16, in which a latch mechanism is provided for holding said playback arm upwardly away from said record during recording, whenever desired.

25. The invention as defined in claim 16, in which manually operated means are provided for holding said recording arm raised out of action during extended periods of playback.

26. The invention as defined in claim 16, in which a cam mechanism is provided for causing said recording arm and playback arm to be lifted prior to operation of said retraction means when said cover is raised.

References Cited in the file of this patent

UNITED STATES PATENTS

| | | |
|---|---|---|
| 1,247,441 | Moroney | Nov. 20, 1917 |
| 1,343,087 | Peremi | June 8, 1920 |
| 1,926,580 | Clark | Sept. 12, 1933 |
| 1,998,105 | Sullivan | Apr. 16, 1935 |
| 2,133,596 | Thompson | Oct. 18, 1938 |
| 2,357,033 | Thompson | Aug. 29, 1944 |
| 2,410,569 | Conant | Nov. 5, 1946 |
| 2,475,744 | Harman | July 12, 1949 |
| 2,485,575 | Deaver | Oct. 25, 1949 |
| 2,506,665 | Giovannucci | May 9, 1950 |

FOREIGN PATENTS

| | | |
|---|---|---|
| 114,471 | Australia | Dec. 23, 1941 |
| 616,469 | Great Britain | Jan. 21, 1949 |